(12) United States Patent
Popovic

(10) Patent No.: US 9,347,376 B2
(45) Date of Patent: May 24, 2016

(54) LIQUIFIED FUEL BACKUP FUEL SUPPLY FOR A GAS TURBINE

(71) Applicant: General Electric Company, Schenectady, NY (US)

(72) Inventor: Predrag Popovic, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 440 days.

(21) Appl. No.: 13/869,385

(22) Filed: Apr. 24, 2013

(65) Prior Publication Data

US 2014/0318134 A1    Oct. 30, 2014

(51) Int. Cl.
*F02C 7/224* (2006.01)
*F02C 3/22* (2006.01)

(52) U.S. Cl.
CPC . *F02C 7/224* (2013.01); *F02C 3/22* (2013.01); *F05D 2250/13* (2013.01)

(58) Field of Classification Search
CPC .................................. F02C 3/22; F02C 7/224
See application file for complete search history.

(56) References Cited

U.S. PATENT DOCUMENTS

| | | | |
|---|---|---|---|
| 3,517,679 A * | 6/1970 | Williamson | F02C 9/40 137/1 |
| 3,766,734 A * | 10/1973 | Jones | F02C 9/40 60/39.281 |
| 3,897,754 A | 8/1975 | Jerde | |
| 4,025,291 A | 5/1977 | Black | |
| 4,189,914 A * | 2/1980 | Marek | F02C 7/2365 261/28 |
| 4,399,795 A | 8/1983 | Brown | |
| 4,432,336 A | 2/1984 | Black | |
| 4,485,792 A | 12/1984 | Van der Weide | |
| 4,506,647 A * | 3/1985 | Geddes | F02M 31/10 123/523 |
| 4,882,041 A | 11/1989 | Scott et al. | |
| 4,887,579 A | 12/1989 | Fenton et al. | |
| 4,994,149 A | 2/1991 | Scott et al. | |
| 5,170,727 A * | 12/1992 | Nielsen | B05B 7/32 110/238 |
| 5,467,722 A * | 11/1995 | Meratla | B01D 53/002 110/216 |
| 5,542,398 A | 8/1996 | Marcon | |
| 5,685,139 A | 11/1997 | Mick et al. | |
| 6,539,775 B2 | 4/2003 | Driftmeier | |
| 6,609,378 B2 * | 8/2003 | Scott | F02C 9/40 60/39.281 |
| 6,609,509 B2 | 8/2003 | Asada et al. | |
| 6,748,931 B2 | 6/2004 | Ricco | |
| 6,779,333 B2 * | 8/2004 | Gerhold | F02C 9/40 60/39.53 |
| 6,896,707 B2 | 5/2005 | O'Rear et al. | |
| 6,904,896 B2 | 6/2005 | Ricco et al. | |
| 7,047,947 B2 | 5/2006 | Van Dyke | |
| 7,089,745 B2 | 8/2006 | Roby et al. | |
| 7,322,198 B2 | 1/2008 | Roby et al. | |
| 7,574,856 B2 * | 8/2009 | Mak | F01K 23/10 60/39.182 |
| 7,770,396 B2 | 8/2010 | Roby et al. | |
| 8,225,611 B2 | 7/2012 | Roby | |

(Continued)

*Primary Examiner* — Lorne Meade
(74) *Attorney, Agent, or Firm* — Dority & Manning, PA

(57) ABSTRACT

A system for supplying a gaseous fuel to a gas turbine includes a liquefied fuel source for supplying a liquefied fuel to a liquid fuel pump that is disposed downstream from the liquefied fuel source. The liquid fuel pump is sufficient to raise the pressure of the liquefied fuel to a substantially supercritical pressure. A supercritical liquefied fuel vaporizer is disposed downstream from the liquid fuel pump. A heat recovery system is in thermal communication with the liquefied fuel. The heat recovery system is positioned between the liquid fuel source and the supercritical liquefied fuel vaporizer.

18 Claims, 4 Drawing Sheets

(56) References Cited

U.S. PATENT DOCUMENTS

| | | | |
|---|---|---|---|
| 8,430,360 B2 * | 4/2013 | Schwarze | F02C 9/40 244/135 C |
| 2011/0101166 A1 * | 5/2011 | Schwarze | F02C 9/40 244/135 R |
| 2012/0055166 A1 * | 3/2012 | John | F01K 23/10 60/772 |

* cited by examiner

LIQUIFIED FUEL BACKUP FUEL SUPPLY FOR A GAS TURBINE

FIELD OF THE INVENTION

The present invention generally involves a gas turbine. More specifically, the invention relates to a backup fuel supply for providing a gaseous fuel from a liquefied fuel to a combustor of a gas turbine.

BACKGROUND OF THE INVENTION

A combustion section of a gas turbine generally includes a plurality of combustors that are arranged in an annular array around an outer casing. Pressurized air flows from a compressor to each combustor. Fuel from a fuel supply is mixed with the pressurized air in each combustor to form a combustible mixture within a combustion chamber of each combustor. The combustible mixture is burned to produce hot combustion gases having a high pressure and high velocity. The combustion gases are routed through a hot gas path towards an inlet of a turbine. Thermal and kinetic energy are transferred from the combustion gases to the turbine to cause the turbine to rotate, thereby producing mechanical work.

Many high efficiency gas turbines, particularly in the power generation industry, are fueled by a gaseous fuel such as natural gas and/or a liquid fuel such as diesel or kerosene. Typically, the natural gas is mixed with the pressurized air from the compressor to provide a combustible mixture to the combustion chamber for combustion. The liquid fuel is used for diffusion combustion during turndown and or part load operation of the gas turbine. However, some gas turbines may operate solely on the liquid fuel.

Natural gas and/or liquid fuel generally require a reliable supply source and an adequate delivery system that extends between the source and the gas turbine facility. If either the source or the delivery system are interrupted and/or compromised such as by equipment failure or excess demand, the gas turbine will have to be taken offline until the fuel supply issue can be resolved. As a result, many gas turbine operators utilize a backup fuel supply system that is fluidly connected to the combustors.

Typically, a backup fuel supply system relies on a liquid fuel such as kerosene or diesel to fuel the combustors. However, various alternative light and highly volatile liquefied fuels such as propane, butane, and variety of their mixes known as liquefied petroleum gas or LPG fuels are also suitable as alternative backup liquid or liquefied fuels for gas turbines. In addition, various other fuels with similar thermodynamic properties are also suitable as alternative backup fuels to the more commonly used kerosene and/or diesel such as pentane, methanol, ethanol and dimethyl ether (DME).

In many instances, these alternative liquefied fuels are produced as byproducts of various industrial processes at industrial facilities such as refineries, chemical plants and/or liquefied natural gas processing plants. As a result, these alternative liquefied fuels are readily available and can be collected and stored for later use onsite or routed to an offsite location, thereby reducing the operator's costs to operate the backup fuel supply system. In addition, the alternative liquefied fuels generally have higher specific caloric values and are generally cleaner to burn than the commonly used liquid fuels such as kerosene and diesel fuels.

In order to use the alternative liquefied fuels as a backup fuel in either a gaseous or liquid fuel combustor, the alternative liquefied fuels must be vaporized and mixed with a diluent and/or a carrier gas such as air to produce a gaseous fuel mixture. The gaseous fuel mixture may then be injected into the combustor where it is used in the same fashion as in a natural gas combustor. The process of vaporization of the alternative liquid/liquefied fuels retains low emissions associated with combustion of gaseous fuel and reduces or eliminates the need for additional combustion hardware required to burn the more commonly used liquid backup fuels (kerosene or diesel) while also realizing the benefits of using the alternative liquefied fuels to fuel the combustors.

Vaporization system efficiency, capital and/or operating costs continue to drive operators and designers to seek new and improved backup fuel systems that utilize alternative fuels such as the liquefied fuels described above. Therefore, an improved backup fuel system that allows operators to use the alternative liquefied fuels would be useful.

BRIEF DESCRIPTION OF THE INVENTION

Aspects and advantages of the invention are set forth below in the following description, or may be obvious from the description, or may be learned through practice of the invention.

One embodiment of the present invention is a system for supplying a gaseous fuel to a gas turbine. The system includes a liquefied fuel source for supplying a liquefied fuel to a liquid fuel pump that is disposed downstream from the liquefied fuel source. The liquid fuel pump is sufficient to raise the pressure of the liquefied fuel to a substantially supercritical pressure. A supercritical liquefied fuel vaporizer is disposed downstream from the liquid fuel pump. A heat recovery system is in thermal communication with the liquefied fuel between liquid fuel source and the supercritical liquefied fuel vaporizer.

Another embodiment of the present invention is a gas turbine. The gas turbine includes a combustor, a primary fuel supply for providing a primary fuel to the combustor and a backup fuel supply that is in fluid communication with the combustor. The backup fuel supply includes a system for supplying a gaseous fuel to the combustor. The system comprises a liquefied fuel source for supplying a liquefied fuel, a liquid fuel pump that is disposed downstream from the liquefied fuel source, wherein the liquid fuel pump is sufficient to raise the pressure of the liquefied fuel to a substantially supercritical pressure. The system further includes a supercritical liquefied fuel vaporizer that is disposed downstream from the liquid fuel pump, and a heat recovery system that is in thermal communication with the liquefied fuel. The heat recovery system is disposed between the liquefied fuel source and the supercritical liquefied fuel vaporizer.

The present invention may also include a gas turbine. The gas turbine generally includes a compressor, a combustor disposed downstream from the compressor, a turbine disposed downstream from the combustor and a system for supplying a gaseous fuel to the combustor. The system comprises a liquid fuel source for supplying a liquefied fuel and a liquid fuel pump that is disposed downstream from the liquefied fuel source where the liquid fuel pump raises the pressure of the liquefied fuel to a substantially supercritical pressure. The system further includes a supercritical liquefied fuel vaporizer that is disposed downstream from the liquid fuel pump. The system also includes a heat recovery system is in thermal communication with the liquefied fuel upstream from the supercritical liquefied fuel vaporizer.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
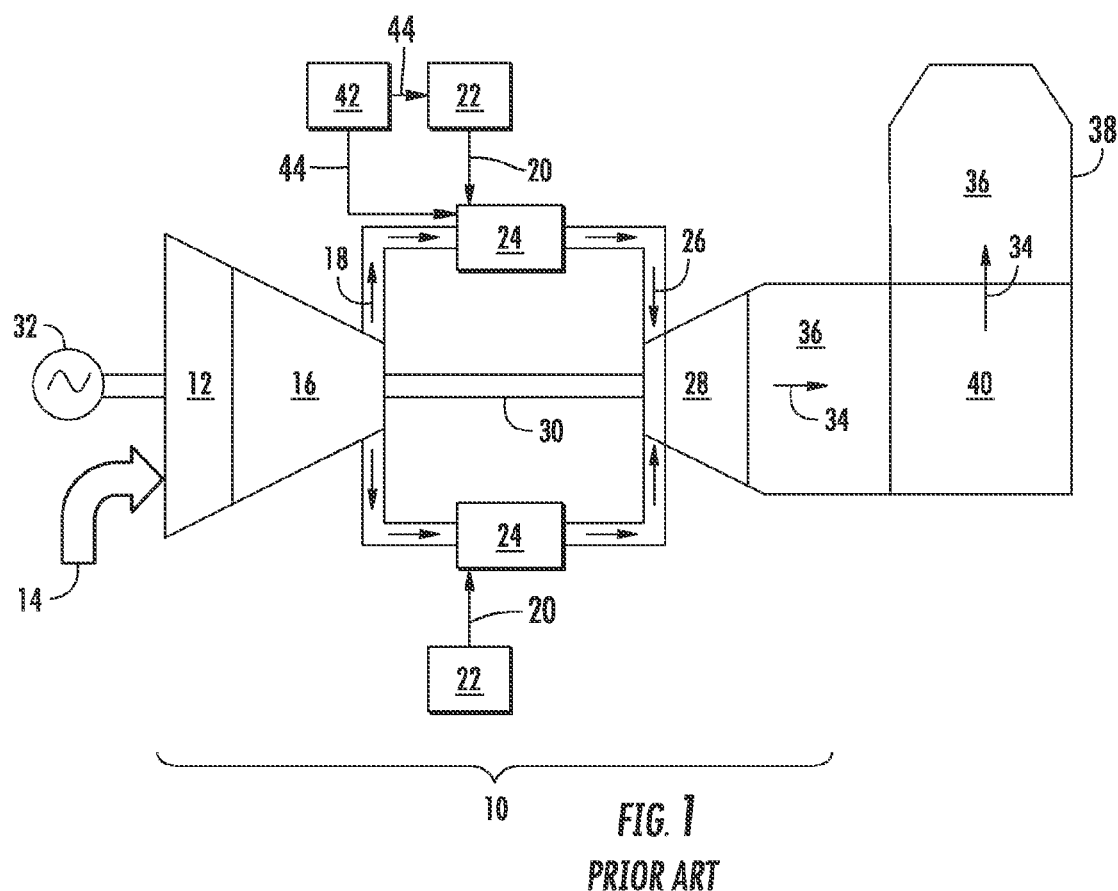
FIG. 1 is a functional block diagram of an exemplary gas turbine within the scope of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel to an axial centerline of a particular component.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of a backup fuel system for an industrial gas turbine for purposes of illustration, one of ordinary skill in the art will readily appreciate that embodiments of the present invention may be applied to any turbomachine and is not limited to a gas turbine unless specifically recited in the claims.

Referring now to the drawings, wherein identical numerals indicate the same elements throughout the figures, FIG. 1 provides a functional block diagram of an exemplary gas turbine 10 that may incorporate various embodiments of the present invention. As shown, the gas turbine 10 generally includes an inlet section 12 that may include a series of filters, cooling coils, moisture separators, and/or other devices to purify and otherwise condition a working fluid (e.g., air) 14 entering the gas turbine 10. The working fluid 14 flows to a compressor section where a compressor 16 progressively imparts kinetic energy to the working fluid 14 to produce a compressed working fluid 18.

The compressed working fluid 18 is mixed with a primary fuel 20 from a primary fuel supply 22 to form a combustible mixture within one or more combustors 24. The primary fuel 20 may include a liquid and/or a gaseous fuel. The combustible mixture is burned to produce combustion gases 26 having a high temperature and pressure. The combustion gases 26 flow through a turbine 28 of a turbine section to produce work. For example, the turbine 28 may be connected to a shaft 30 so that rotation of the turbine 28 drives the compressor 16 to produce the compressed working fluid 18. Alternately or in addition, the shaft 30 may connect the turbine 28 to a generator 32 for producing electricity.

Exhaust gases 34 from the turbine 28 flow through an exhaust section 36 that connects the turbine 28 to an exhaust stack 38 that is downstream from the turbine 28. The exhaust section 36 may include, for example, a heat recovery steam generator 40 for cleaning and extracting additional heat from the exhaust gases 34 prior to release to the environment. In particular embodiments, a backup fuel supply 42 is fluidly connected to the one or more combustors 24 to provide a backup fuel 44 to the one or more combustors 24 in case of an interruption of the supply of the primary fuel 22. The backup fuel supply 42 may be fluidly connected directly to the one or more combustors 24 and/or may be fluidly connected to the fuel supply 22 so as to route the backup fuel 44 through common fuel circuits (not shown) to the combustor 24.

As used herein, the term "liquefied fuel" includes fuels that are typically in a liquid state as a result of cooling and/or compressing the gas. For example, as used herein, the term "liquefied fuel" includes propane, butane, and variety of their mixes known as liquefied petroleum gas (LPG) fuels. In addition, as used herein "liquefied fuel" includes any other fuels with similar thermodynamic properties as those previously listed such as pentane, methanol, ethanol, and dimethyl ether. In one embodiment, the liquefied fuel is at least one of propane, butane, liquefied petroleum gas, pentane, methanol, ethanol, and dimethyl ether. As used herein, the term "liquid fuel" includes liquid fuels which are normally in a liquid state at or about ambient pressures and temperatures such as kerosene and diesel fuels.

Figure 2:
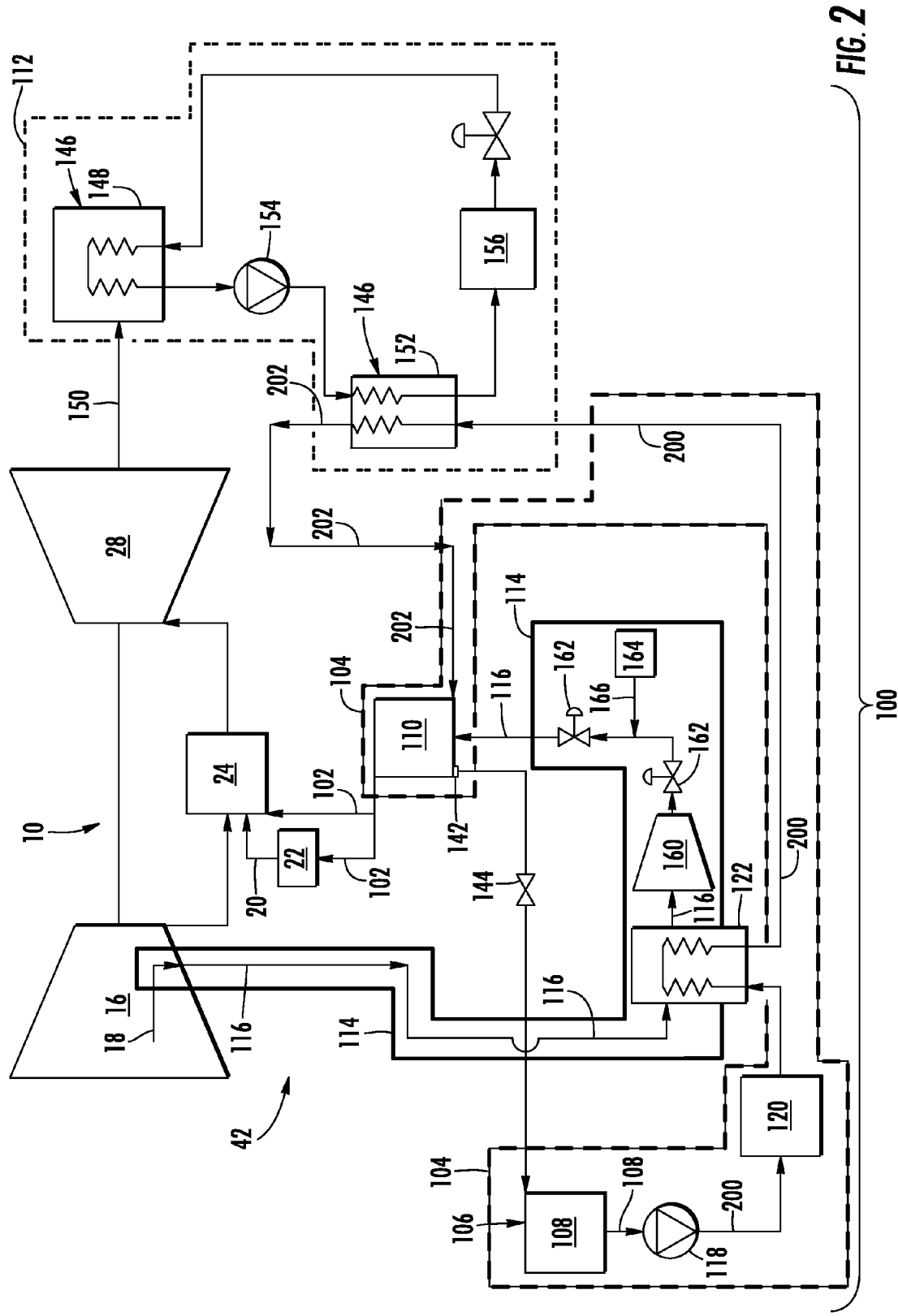
FIG. 2 is a block diagram of an exemplary backup fuel supply for providing a gaseous fuel from a liquefied fuel to the gas turbine.

FIG. 2 provides a block diagram of an exemplary backup fuel supply 42. As shown in FIG. 2, the backup fuel supply 42 generally includes a system 100 for providing a gaseous fuel 102 from a liquefied fuel as a backup fuel 44 (FIG. 1) to the one or more combustors 24. In various embodiments, as shown in FIG. 2, the system 100 includes a liquefied fuel vaporization unit 104 having a liquefied fuel source 106 for supplying a flow of a liquefied fuel 108, a supercritical liquefied fuel vaporizer 110 disposed downstream from the liquefied fuel source 106, and a heat recovery system 112 that is in thermal communication with the liquefied fuel 108. In particular embodiments, the heat recovery system 112 is disposed between the liquefied fuel source 106 and the supercritical liquefied fuel vaporizer 110. In particular embodiments, the heat recovery system 112 provides sufficient thermal energy to the liquefied fuel 108 so as to raise the temperature of the liquefied fuel 108 to a superheated state or condition. In further embodiments, the system 100 includes a diluent supply 114. The diluent supply 114 supplies a diluent 116 such as air, nitrogen, steam or other diluent to the supercritical liquefied fuel vaporizer 110.

In particular embodiments, the vaporization unit 104 includes a liquid fuel pump 118 disposed downstream from the liquefied fuel source 106. In particular embodiments, the liquid fuel pump 118 increases fuel pressure of the liquefied fuel 108 to a supercritical pressure. A buffer tank 120 may be disposed downstream from the liquefied fuel source 106 and/or the liquid fuel pump 118 to evenly distribute the liquefied fuel 108. One or more heat exchangers 122 may be disposed downstream from the liquefied fuel source 106 and upstream from the supercritical liquefied fuel vaporizer 110.

Figure 3:
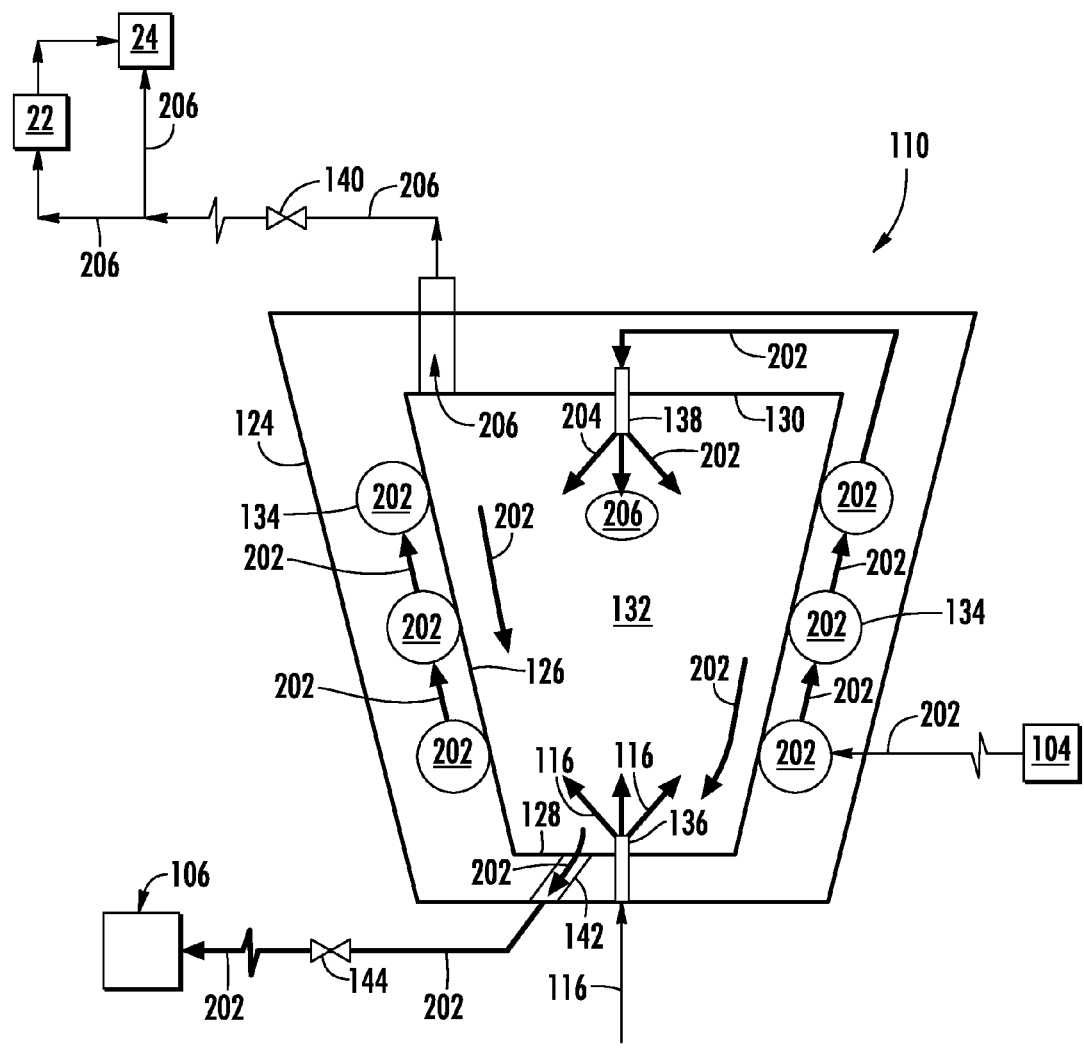
FIG. 3 is a cross section side view of an exemplary supercritical liquefied fuel vaporizer according to one or more embodiments of the present invention.

FIG. 3 provides a cross section side view of an exemplary supercritical liquefied fuel vaporizer 110 according to one or more embodiments of the present invention. As shown in FIG. 3, the supercritical liquefied fuel vaporizer 110 generally includes an outer wall 124, an inner wall 126, a bottom portion 128 and a top portion 130. At least some of the outer wall 124, the inner wall 126, the bottom portion 128 and the top portion 130 may at least partially define a high pressure plenum 132 within the supercritical liquefied fuel vaporizer 110. In particular embodiments, the supercritical liquefied fuel vaporizer 110 further includes one or more fluid conduits 134 fluidly connected to the liquefied fuel source 104.

In one embodiment, as shown in FIG. 3, the one or more fluid conduits 134 extend between the outer wall 124 and the inner wall 126. In this manner, the one or more fluid conduits 134 are in thermal communication with the inner wall 126. The fluid conduits 134 are generally routed from the bottom portion 128 to the top portion 130 of the supercritical liquefied fuel vaporizer 110.

As shown in FIG. 3, a diluent injector 136 is disposed within the supercritical liquefied fuel vaporizer 110 proximate to the bottom portion 128. The diluent injector 136 may be arranged to provide a substantially uniform flow of the diluent 116 along the bottom portion 128 and throughout the supercritical liquefied fuel vaporizer 110. For example, the diluent injector 136 may be positioned proximate to a center location of the bottom portion 128.

As shown in FIG. 3, a fuel injector 138 is disposed within the supercritical liquefied fuel vaporizer 110 proximate to the top portion 132. The fuel injector 138 is positioned generally proximate to a center location of the top portion 132. The fuel injector 138 provides for fluid communication between the one or more fluid conduits 134 and the high pressure plenum 132.

As shown in FIGS. 2 and 3, the supercritical liquefied fuel vaporizer 110 may be fluidly connected directly to the combustor 24 and/or to the fuel supply 22 to provide for fluid communication between the supercritical liquefied fuel vaporizer 110 and the combustor 24. A flow control valve 140 may be disposed between the supercritical liquefied fuel vaporizer 110 and the combustor 24 and/or the fuel supply 22. In one embodiment, as shown in FIGS. 2 and 3, the supercritical liquefied fuel vaporizer 110 includes a recirculation outlet 142. The recirculation outlet 142 provides for fluid communication between the supercritical liquefied fuel vaporizer 110 and the liquefied fuel source 106. A valve 144 may be disposed between the recirculation outlet 142 and the liquefied fuel source 106.

As shown in FIG. 2, the heat recovery system 112 generally includes one or more heat exchangers 146. In particular embodiments, at least one heat exchanger 148 is in thermal communication with an exhaust gas stream 150. At least one of the heat exchangers 146 may include an oil heater or other type of heat exchanger that is suitable to extract thermal energy from the exhaust gas stream 150. In one embodiment, the exhaust gas stream 150 is provided by the gas turbine 10. As shown, the heat exchanger 148 may be disposed directly downstream from the turbine 28. The heat exchanger 148 may be positioned at any point downstream from the combustor 24 and/or the turbine 28 within the exhaust gas stream 150. For example, the heat exchanger 148 may be positioned within the HRSG 40 (FIG. 1) or downstream from the HRSG 40 (FIG. 1). In alternate embodiments, the exhaust gas stream 150 may be provided by any industrial device (not shown) or process which generates an exhaust gas stream with sufficient thermal energy to heat the liquefied fuel 108 to a superheated or a near superheated temperature.

In particular embodiments, as shown in FIG. 2, the heat recovery system 112 includes a heat exchanger 152 that is in fluid communication with heat exchanger 148. One or more pumps 154 may provide for fluid communication between heat exchanger 148 and heat exchanger 152. In one embodiment, the heat recovery system 112 includes a startup or auxiliary heater 156.

In particular embodiments, the diluent supply 114 is disposed upstream from the supercritical liquefied fuel, vaporizer 110. The diluent supply 114 is fluidly connected to the diluent injector 136 (FIG. 3). In one embodiment, as shown in FIG. 2, the diluent supply 114 includes the compressor 16 of the gas turbine 10. For example, the diluent supply 114 may draw a portion of the compressed working fluid 18 from an extraction port (not shown) of the compressor 16 to be used as the diluent 116.

In particular embodiments, the diluent supply 114 includes a pump or booster compressor 160 disposed upstream from the supercritical liquefied fuel vaporizer 110. In one embodiment, the booster compressor 160 is disposed downstream from the compressor 16 of the gas turbine 10 and upstream from the supercritical liquefied fuel vaporizer 110. The booster compressor 160 may be used to increase the pressure of the diluent 116 prior to injection into the supercritical liquefied fuel vaporizer 110. The diluent supply 114 may further include one or more control valves 162 for regulating a flow rate of the diluent 116. In particular embodiments, the diluent supply 114 is in thermal communication with the heat exchanger 122. In further embodiments, the diluent supply 114 may include an alternate diluent supply 164 for supplying alternate diluents 166 such as nitrogen or steam to the supercritical liquefied fuel vaporizer 110.

Figure 4:
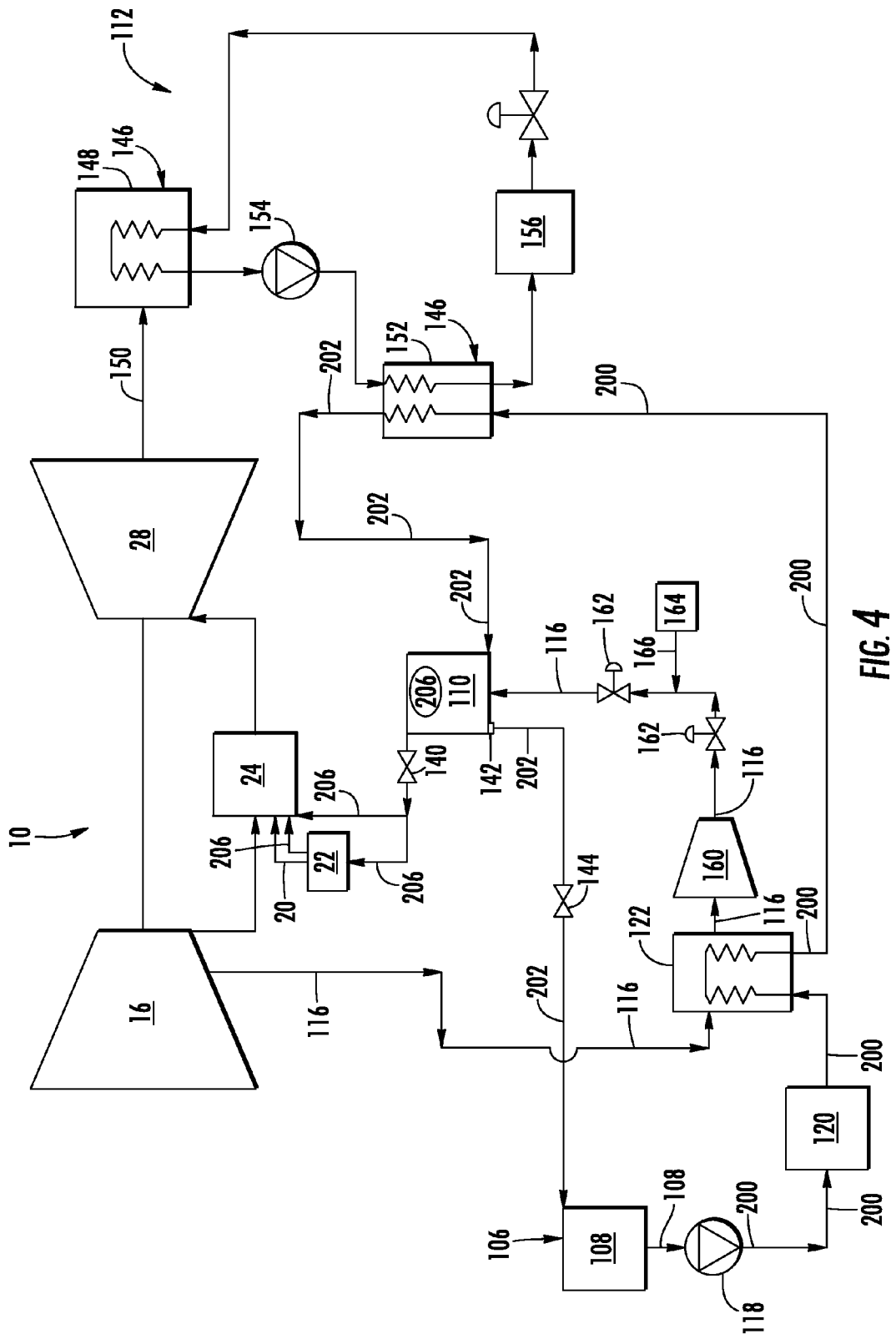
FIG. 4 is a functional block diagram of the backup fuel supply system for providing a gaseous fuel from a liquefied fuel to the gas turbine according to various embodiments of the present invention.

FIG. 4 provides a schematic diagram of the gas turbine 10 and the system 100 as shown in FIG. 2 in operation according to various embodiments of the present invention. In one embodiment, as shown in FIG. 4, the liquefied filet 108 is routed from the liquefied fuel source 106 and through the liquid fuel pump 118. The liquid fuel pump 118 raises the fuel pressure of the liquefied fuel 108 to a supercritical or a near supercritical pressure, thereby providing a highly pressurized liquefied fuel 200, in one embodiment, the highly pressurized liquefied fuel 200 flows into the buffer tank 120 so as to minimize any impact of flow variation and/or flow disruption from the fuel source 106. In one embodiment, the highly pressurized liquefied fuel 200 is routed through the heat exchanger 122. In this manner, thermal energy from the diluent 116 such as the compressed working fluid 18 from the compressor 16 is transferred to the highly pressurized liquefied fuel 200.

The highly pressurized liquefied fuel 200 is routed through the heat exchanger 152 of the heat recovery system 112 where thermal energy from the exhaust gas stream 150 flowing from the turbine 28 is transferred to the highly pressurized liquefied fuel 200. In one embodiment, the thermal energy transferred is sufficient to raise the temperature of the highly pressurized liquid fuel 200 to a superheated or a supercritical temperature, thereby transitioning the highly pressurized liquefied fuel 200 into a supercritical liquefied fuel 202. In this manner, the supercritical liquefied fuel 202 may carry sufficient thermal energy to vaporize in the supercritical liquefied fuel vaporizer 110. In one embodiment, the auxiliary heater 156 may provide thermal energy to the highly pressurized liquefied fuel 200 during various operation modes of the gas turbine 10 where the exhaust gas stream 150 from the gas turbine 10 may be unavailable or has insufficient thermal energy to adequately raise the temperature of the highly pressurized liquefied fuel 200.

In one embodiment, as shown in FIGS. 3 and 4, the supercritical liquefied fuel 202 is then routed into the supercritical liquefied fuel vaporizer 110. As shown in FIG. 3, the supercritical liquefied fuel 202 flows through the fluid conduits 134 that extend within the supercritical liquefied fuel vaporizer 110. Thermal energy from the supercritical liquefied fuel 202 is transferred to the inner wall 126 as the supercritical liquefied fuel 202 flows towards the top portion of the supercritical vaporizer 110.

As shown in FIG. 3, the supercritical liquefied fuel 202 is then injected through the fuel injector 138 into the high pressure plenum 132 and the diluent 116 is simultaneously injected into the high pressure plenum 132 through the diluent injector 136. As shown in FIG. 4, the diluent 116 may be routed through the compressor 160 to increase the pressure of the diluent as it is routed towards the supercritical liquefied fuel vaporizer 110. In one embodiment, other diluents such as nitrogen may be added to the diluent 116 from the alternate diluent supply 164.

As shown in FIG. 3, most of the supercritical liquefied fuel 202 flashes into a fuel vapor 204 due to a sudden decrease in pressure between the supercritical liquefied fuel 202 and the high pressure plenum 132. The fuel vapor 204 and the diluent 116 mix within the high pressure plenum 132 to provide a gaseous fuel 206.

The thermal energy transferred to the inner wall 126 from the supercritical liquefied fuel 202 is generally sufficient to maintain an inner wall temperature that is above the saturation temperature of the supercritical liquefied fuel 202 at operating pressure within the high pressure plenum 132. As a result, most of the supercritical liquefied fuel 202 that is not initially vaporized as it enters the high pressure plenum 132 evaporates as it falls onto the heated inner wall 126, mixes with the fuel vapor 204 and the diluent 116 and then flows out of the high pressure plenum 132 as the gaseous fuel 206. In particular embodiments, as shown in FIGS. 3 and 4, the gaseous fuel 206 is routed out of the high pressure plenum 132 to the fuel supply 22 and/or directly into the combustor 24 as the backup fuel 44 (FIG. 1) for the gas turbine 10. Any portion of the supercritical liquefied fuel 202 that does not vaporize and/or evaporate may be routed through recirculation outlet 142 back to the liquefied fuel source 106. This ensures that the gaseous fuel 206 that enters the combustor 24 and/or the fuel supply 22 is in a gaseous state.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for supplying a gaseous fuel to a gas turbine, comprising:
  a. a liquefied fuel source for supplying a liquefied fuel;
  b. a liquid fuel pump disposed downstream from the liquefied fuel source, wherein the liquid fuel pump raises the pressure of the liquefied fuel to a substantially supercritical pressure;
  c. a supercritical liquefied fuel vaporizer disposed downstream from the liquid fuel pump, wherein the supercritical liquefied fuel vaporizer comprises an outer wall, an inner wall and a fluid conduit that extends therebetween, an inlet end of the fluid conduit receiving the liquefied fuel pressurized to the substantially supercritical pressure, the fluid conduit in thermal communication with the inner wall, the inner wall enclosing a trapezoid shaped high pressure plenum, the inner wall comprising a top wall, a bottom wall, a left-side wall and a right-side wall, a length of the to wall is greater than a length of the bottom wall, a left end of the to wall connected to a left end of the bottom wall by the left-side wall, a right end of the top wall connected to a right end of the bottom wall by the right-side wall, wherein the left-side wall and the right-side wall converge toward each other as the left-side wall and the right-side wall extend from the to wall to the bottom wall;
  d. a heat recovery system that is in thermal communication with the liquefied fuel, wherein the heat recovery system is disposed between the liquid fuel pump and the supercritical liquefied fuel vaporizer, wherein the heat recovery system superheats the liquefied fuel upstream from the inlet end of the fluid conduit and the superheated liquefied fuel heats the inner wall of the supercritical liquefied fuel vaporizer; and
  e. an outlet end of the fluid conduit connected to a liquefied fuel injector positioned in the to wall, the liquefied fuel injector injecting the superheated liquefied fuel, wherein a portion of the superheated liquefied fuel flashes into a fuel vapor inside the trapezoid shaped high pressure plenum and a remaining liquid portion of the superheated liquefied fuel evaporates as the remaining liquid portion falls onto the inner wall heated by the superheated liquefied fuel in the fluid conduit.

2. The system as in claim 1, wherein the liquefied fuel is at least one of propane, butane, liquefied petroleum gas, pentane, methanol, ethanol, or dimethyl ether.

3. The system as in claim 1, wherein the heat recovery system is in thermal communication with an exhaust gas stream.

4. The system as in claim 1, wherein the heat recovery system is in thermal communication with an exhaust gas stream of the gas turbine.

5. The system as in claim 1, wherein the heat recovery system superheats the liquefied fuel to a supercritical temperature.

6. The system as in claim 1, wherein the supercritical liquefied fuel vaporizer includes a diluent injector positioned in the bottom wall.

7. The system as in claim 1, further comprising a diluent supply for supplying a diluent to the supercritical liquefied fuel vaporizer, wherein the diluent supply includes a compressor fluidly connected to a gas turbine.

8. A gas turbine, comprising:
  a. a combustor;
  b. a primary fuel supply for providing a primary fuel to the combustor;
  c. a backup fuel supply in fluid communication with the combustor, the backup fuel supply including a system for supplying a gaseous fuel to the combustor; and
  d. wherein the system for supplying the gaseous fuel to the gas turbine comprises:
    i. a liquefied fuel source for supplying a liquefied fuel;
    ii. a liquid fuel pump disposed downstream from the liquefied fuel source, wherein the liquid fuel pump raises the pressure of the liquefied fuel to a substantially supercritical pressure;

iii. a supercritical liquefied fuel vaporizer disposed downstream from the liquid fuel pump, wherein the supercritical liquefied fuel vaporizer comprises an outer wall, an inner wall and a fluid conduit that extends therebetween, an inlet end of the fluid conduit receiving the liquefied fuel pressurized to the substantially supercritical pressure, the fluid conduit in thermal communication with the inner wall, the inner wall enclosing a trapezoid shaped high pressure plenum, the inner wall comprising a to wall, a bottom wall, a left-side wall and a right-side wall, a length of the top wall is greater than a length of the bottom wall, a left end of the top wall connected to a left end of the bottom wall by the left-side wall, a right end of the top wall connected to a right end of the bottom wall by the right-side wall, wherein the left-side wall and the right-side wall converge toward each other as the left-side wall and the right-side wall extend from the to wall to the bottom wall;

iv. a heat recovery system that is in thermal communication with the liquefied fuel, wherein the heat recovery system is disposed between the liquid fuel pump and the supercritical liquefied fuel vaporizer, wherein the heat recovery system superheats the liquefied fuel upstream from the inlet end of the fluid conduit and the superheated liquefied fuel heats the inner wall of the supercritical liquefied fuel vaporizer; and v. an outlet end of the fluid conduit connected to a liquefied fuel injector positioned in the to wall, the liquefied fuel injector injecting the superheated liquefied fuel, wherein a portion of the superheated liquefied fuel flashes into a fuel vapor inside the trapezoid shaped high pressure plenum and a remaining liquid portion of the superheated liquefied fuel evaporates as the remaining liquid portion falls onto the inner wall heated by the superheated liquefied fuel in the fluid conduit.

9. The gas turbine as in claim 8, wherein the primary fuel comprises at least one of a liquid fuel or a gaseous fuel.

10. The gas turbine as in claim 8, wherein the liquefied fuel is at least one of propane, butane, liquefied petroleum gas, pentane, methanol, ethanol, and dimethyl ether.

11. The gas turbine as in claim 8, wherein the heat recovery system is in thermal communication with an exhaust gas stream.

12. The gas turbine as in claim 8, Wherein the heat recovery system is in thermal communication with an exhaust gas stream of the gas turbine.

13. The gas turbine as in claim 8, wherein the heat recovery system superheats the liquefied fuel to a supercritical temperature.

14. The system as in claim 8, wherein the supercritical liquefied fuel vaporizer includes a diluent injector positioned in the bottom wall.

15. The gas turbine as in claim 8, further comprising a diluent supply for supplying a diluent to the supercritical liquefied fuel vaporizer, wherein the diluent supply includes a compressor fluidly connected to a gas turbine.

16. A gas turbine, comprising:
 a. a compressor;
 b. a combustor disposed downstream from the compressor;
 c. a turbine disposed downstream from the combustor; and
 d. a system for supplying a gaseous fuel to the combustor, the system comprising:
  i. a liquid fuel source for supplying a liquefied fuel;
  ii. a liquid fuel pump disposed downstream from the liquefied fuel source, wherein the liquid fuel pump raises the pressure of the liquefied fuel to a substantially supercritical pressure;
  iii. a supercritical liquefied fuel vaporizer disposed downstream from the liquid fuel pump wherein the supercritical liquefied fuel vaporizer comprises an outer wall, an inner wall and a fluid conduit that extends therebetween, an inlet end of the fluid conduit receiving the liquefied fuel pressurized to the substantially supercritical pressure, the fluid conduit in thermal communication with the inner wall, the inner wall enclosing a trapezoid shaped high pressure plenum, the inner wall comprising a top wall, a bottom wall, a left-side wall and a right-side wall, a length of the to wall is greater than a length of the bottom wall, a left end of the top wall connected to a left end of the bottom wall by the left-side wall, a right end of the to wall connected to a right end of the bottom wall by the right-side wall, wherein the left-side wall and the right-side wall converge toward each other as the left-side wall and the right-side wall extend from the to wall to the bottom wall;
  iv. a heat recovery system that is in thermal communication with the liquefied fuel upstream from the supercritical liquefied fuel vaporizer, wherein the heat recovery system superheats the liquefied fuel upstream from the inlet end of the fluid conduit and the superheated liquefied fuel heats the inner wall of the supercritical liquefied fuel vaporizer; and
  v. an outlet end of the fluid conduit connected to a liquefied fuel injector positioned in the top wall, the liquefied fuel injector injecting the superheated liquefied fuel, wherein a portion of the superheated liquefied fuel flashes into a fuel vapor inside the trapezoid shaped high pressure plenum and a remaining liquid portion of the superheated liquefied fuel evaporates as the remaining liquid portion falls onto the inner wall heated by the superheated liquefied fuel in the fluid conduit, the fuel vapor supplied as the gaseous fuel to the combustor.

17. The gas turbine as in claim 16, wherein the liquefied fuel comprises at least one of propane, butane, liquefied petroleum gas, pentane, methanol, ethanol, and dimethyl ether.

18. The gas turbine as in claim 16, wherein the heat recovery system is in thermal communication with an exhaust gas stream flowing from the turbine.

* * * * *